No. 818,381. PATENTED APR. 17, 1906.
J. JOUBERT & F. SUTER.
APPARATUS FOR SLAYING WARPS.
APPLICATION FILED JULY 25, 1904.
3 SHEETS—SHEET 1.
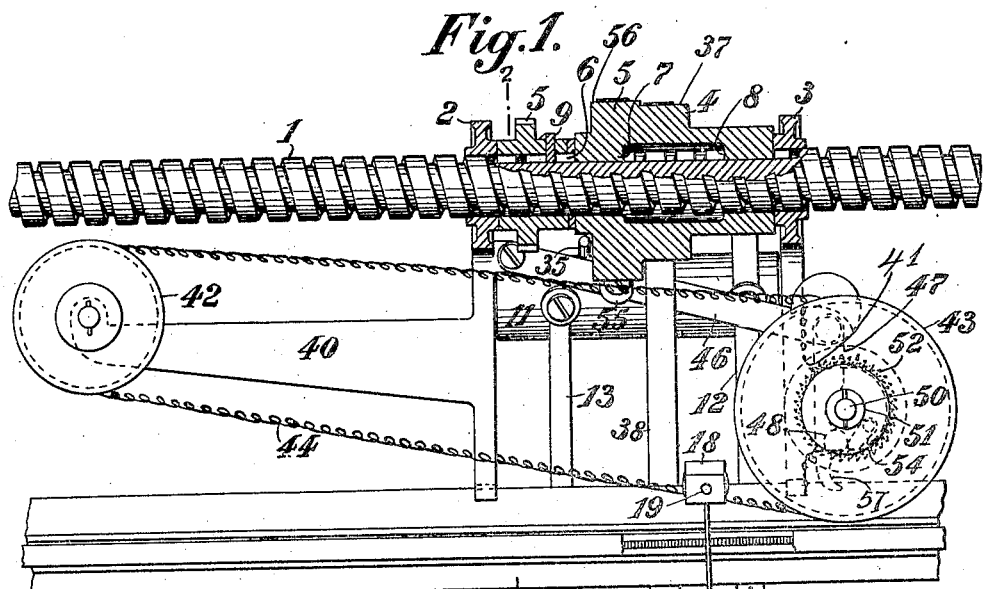
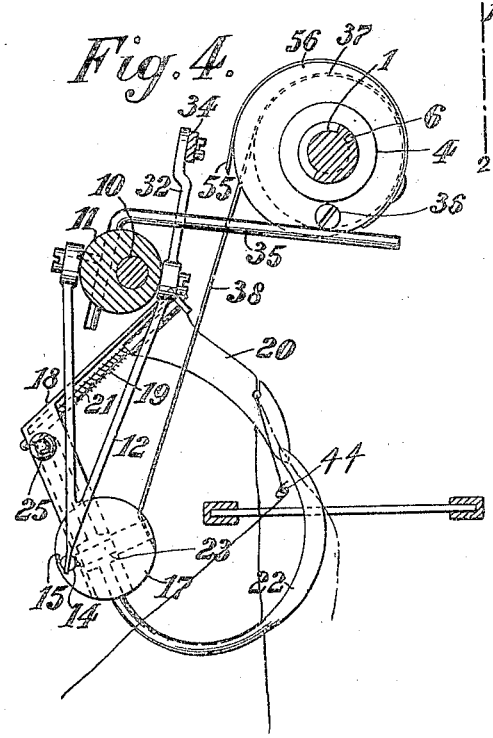
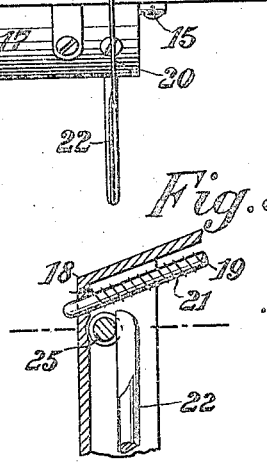
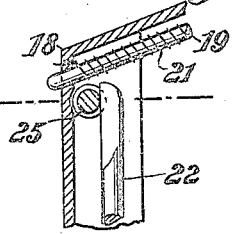
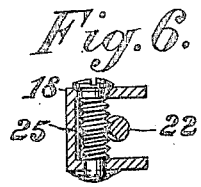
Witnesses
Alfred Bosshardt
Stanley R Bramall
Inventors
Joseph Joubert
Frédéric Suter
Per F. Bosshardt
Attorney No. 818,381. PATENTED APR. 17, 1906.
J. JOUBERT & F. SUTER.
APPARATUS FOR SLAYING WARPS.
APPLICATION FILED JULY 25, 1904.
3 SHEETS—SHEET 2.
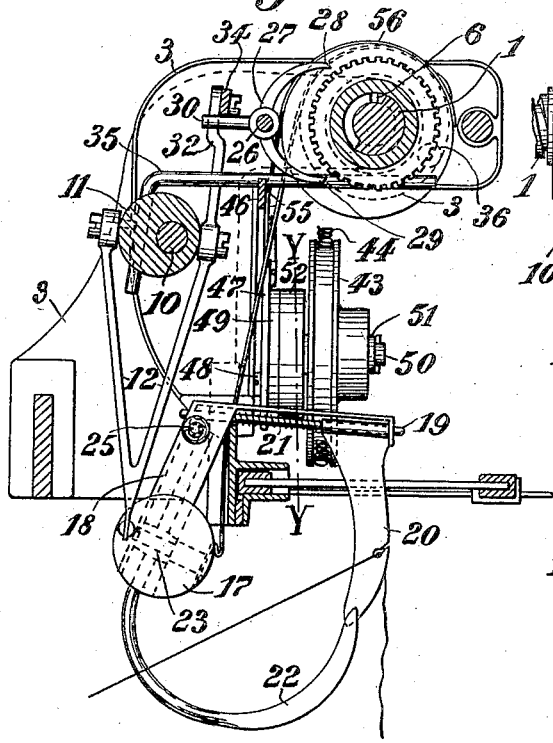
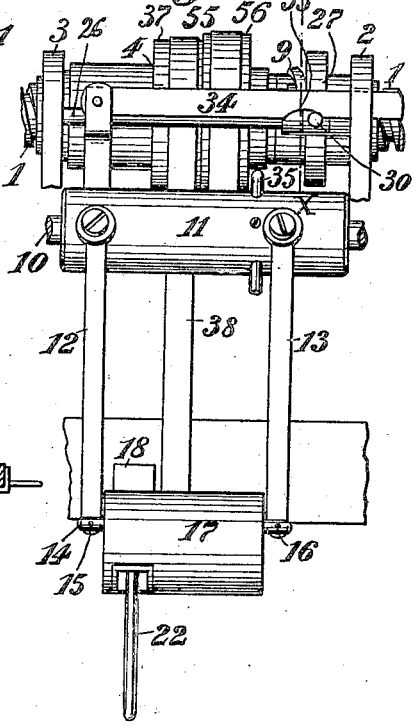
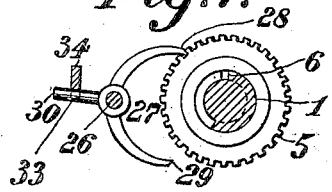
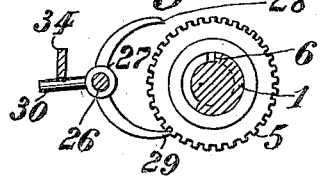
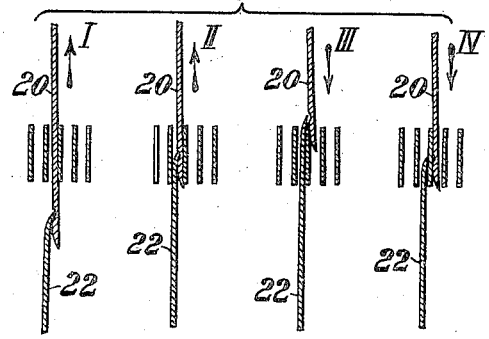
Witnesses:
Alfred Bosshardt
Stanley Bramall
Inventors:
Joseph Joubert
Frédéric Suter
Per F. Ishardt
Attorney No. 818,381. PATENTED APR. 17, 1906.
J. JOUBERT & F. SUTER.
APPARATUS FOR SLAYING WARPS.
APPLICATION FILED JULY 25, 1904.
3 SHEETS—SHEET 3.
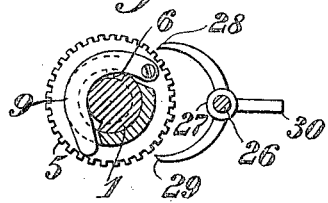
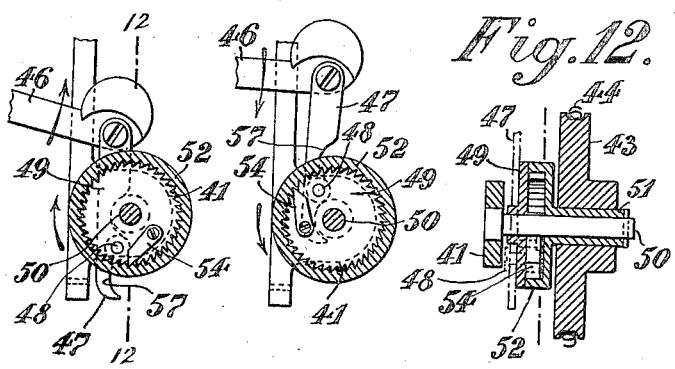
Witnesses:
Alfred Bosshardt
Stanley E. Bramall
Inventors,
Joseph Joubert
Frédéric Suter
Per A. Bosshardt,
Attorney.

UNITED STATES PATENT OFFICE.

JOSEPH JOUBERT AND FRÉDÉRIC SUTER, OF LYON, FRANCE.

APPARATUS FOR SLAYING WARPS.

No. 818,381.     Specification of Letters Patent.     Patented April 17, 1906.

Application filed July 25, 1904. Serial No. 218,040.

*To all whom it may concern:*

Be it known that we, JOSEPH JOUBERT, a citizen of France, and FRÉDÉRIC SUTER, a citizen of Switzerland, residing at Lyon, in the Republic of France, have invented new and useful Improvements in Apparatus for Slaying Warps, of which the following is a specification.

This invention relates to improvements in apparatus for slaying warps, and has for its object to provide such apparatus with means for moving the drawing-in hook with tongue in an arc through the reed, the center of such hook and tongue being rendered slidable along the reed-dents during operation, means for accurately adjusting the said tongue and hook in relation to each other in accordance with the thickness of the reed-dent, and means for adjusting the said hook to suit various reed widths, the whole being so arranged that the warp-threads cannot get pinched between the reed-dent and the said tongue and can be placed from the said hooks direct upon a transporting member without any intermediate means. We attain these objects by the mechanism illustrated in the accompanying two sheets of drawings, showing one embodiment of our invention, and in which—
Figure 1 is a front view; Fig. 2, an end view from the left, partly in section, on line 2 2, Fig. 1; Fig. 3, a back view. Fig. 4 is a side view of the drawing-in hook and its mechanism cleared from all framework; Figs. 5 and 6, sections of details at an enlarged scale; Figs. 7 and 8, side views of details in various positions; Fig. 9, a view showing the function of the drawing-in hook with tongue. Figs. 10 and 11 are cross-sections on lines X X and Y Y of Figs. 3 and 2, respectively, Fig. 3 viewed from the right and Fig. 2 viewed from the left. Fig. 12 is a vertical longitudinal section on the line 12 12 of Fig. 11; and Fig. 13, a vertical cross-section like that in Fig. 11, but with the respective elements shown in a different position.

Similar figures refer to similar parts throughout the several views.

In carrying out our invention and referring to Figs. 1, 2, 3, and 4, we form the part of the apparatus adapted to slide upon the screwed spindle 1, mounted in a frame, with two sides 2 and 3, connected together by means of stays, and between these sides we mount upon the said screwed spindle a scroll 4 and a feed-wheel 5. The screwed spindle 1 has a longitudinal groove 6, in which engage the projections 7 and 8 of the scroll 4. To the feed-wheel 5 is secured a spring-pawl 9, engaging in the thread of the screwed spindle. (See more particularly Fig. 1.) Upon the shaft 10, carried by the frame sides 2 and 3, is mounted eccentrically the cylindrical body 11. To the latter are pivoted, by means of screws, two depending arms 12 and 13, forked so as to embrace the cylindrical body 11. The lower end of these arms are linked together by means of a shaft 14, having slotted ends and pins 15 and 16, through the same.
The cylindrical body 11, depending arms 12 and 13, and shaft 14 form thus a parallelogram. Upon the shaft 14 is mounted eccentrically another cylindrical body 17, adapted to turn thereon while the latter carries an angular tool-holder 18, U-shaped in section. (See more particularly Figs. 5 and 6.) On the upper arm of this angular tool-holder is mounted a rod 19, carrying the drawing-in hook 20, and upon the rod 19, which is turnable, is arranged a coiled spring 21, which tends to press the drawing-in hook against its tongue. The tongue 22 is mounted within the lower arm of the tool-holder 18, but allowed to swing sidewise on stud 23 by means of an adjusting-screw 25, engaging with the upper end of the tongue 22, as clearly shown in Figs. 5 and 6. Upon the cross-stay 26 a double pawl 27 is mounted, which has an arm 30 and the ends 28 and 29 of which are adapted to engage in the feed-wheel 5. The depending arm 12 has an upward extension 32, to which is pivoted a horizontal bar 34, having a curved recess 33 and guided at its free end in the frame side 2. Into the cylindrical body 11 is placed the short arm of an angular lever-arm 35, the longer arm of which bears against a crank-stud 36, secured to the scroll 4. Upon the step 37 of the latter is secured a strap 38, the other end of which is secured to the cylindrical body 17. On the supports 40 and 41, projecting from the frame sides 2 and 3, are mounted guide-pulleys 42 43, respectively, over which passes a chain 44. To the frame side 2 is pivoted a lever-arm 46, from the free end of which is suspended an arm 47, having two recesses 57, which arm by means of a screw 48 is coupled with a small wheel 49. The latter is loosely mounted on the stud 50, which carries the guide-pulley 43. Upon the sleeve 51 is secured adjacent to the wheel 49 the feed-wheel 52. The guide-pulley 43 is also secured upon the said sleeve, and to the wheel 49 is pivoted a feed-pawl 54, which engages in the feed-wheel 52. The lever-arm 46 is connected with the step 56 of the scroll 4 by means of the strap 55, its other end being secured to the step 56. The reed through which the warp-threads are to be drawn is slid into a groove formed in the frame of the apparatus and secured therein in a horizontal position.

The apparatus described is mounted on a frame having a treadle and operates as follows: The screwed spindle 1 and its scroll 4 are made to oscillate by means of a lever fixed upon the spindle 1, actuated by a treadle which causes the strap 38, secured to the step 37 of the scroll, to swing the cylindrical body 17 around its rod 14, whereby an up-and-down movement in an arc is imparted to the hook 20 and tongue 22. The crank-stud 36, Fig. 4, partakes of the oscillation of the scroll 4, and as the angular lever 35 bears against the stud 36 the whole parallelogram, consisting of the hanging arms 12 and 13, the cylindrical body 11, and the shaft 14, is so caused to oscillate on the shaft 10 that the hook while moving down also moves horizontally over the reed, as shown in dotted lines, Fig. 4. This movement enables the reed-dents to more readily adapt themselves in relation to the entering hook. When the hook 20 moves upward, the crank-stud 36 acts in a reverse manner. The hook, besides moving in an arc, also recedes horizontally from the reed.

The whole drawing-in action is as follows: The warp-thread is put by hand into the slot of hook 20 while in its lowest position below the reed. When moved upward, it is drawn through the dents, but without being pinched by the hook or tongue. As the hook moves along the dotted lines, Fig. 4, it freely lays the thread right into the grooves of the spiral rope 44, which in turn, as shown later, is shifted along to lay off the thread horizontally sidewise upon the reed along with the threads already drawn in. While the hook with tongue at each up-and-down movement slides to the right the distance of one dent, Fig. 9, the body 17, viewed from the front, Fig. 1, will move more and more to the right or to the left when viewed from the back, Fig. 3, which causes the depending arm 12 with upward extension to slide the bar 34, with its curved recess 33, toward the stud 30, and thus move the double pawl into position shown in Fig. 7, while the feed-wheel 5, during the oscillation of the screwed spindle 1 and the down movement of the hook, remains stationary, so that the scroll 4 is slid to the right in the direction of the hook. After the scroll 4 has brought back the drawing-in hook the curved recess presses upon the stud 30 (see Fig. 3) and positions the double pawl, as shown in Fig. 2, so that the feed-wheel 5 remains stationary, and thereby also the scroll 4. If the latter with the feed-wheel has run too far, the double pawl will take up the position shown in Fig. 8 and the feed-wheel will be prevented from moving upward and with the scroll thereby caused to rotate backward. The forward movement of the hook and scroll is thus always automatically equalized. If the apparatus is used for a hook moving to the right, the other half of the curved recess performs the automatic regulation. In order to permit of regulating the position of the drawing-in hook relative to that of the tongue in accordance with the reed-dent thickness, the tongue 22 can be turned on the stud 23 by means of the screw 25, so that the point of the drawing-in hook will be a short distance away from the tongue, as shown in Fig. 9. The drawing-in hook itself can be turned upward around the axis of the hook 19 to permit of exchanging the reed. At each oscillation of the screwed spindle 1 and the scroll 4 a partial turn is imparted to the wheel 49 by means of the strap 55, lever 46, and arm 47, which movement is transmitted, by means of a pawl 54, to the feed-wheel 52, and thereby to the spiral rope 44, which with its hook-shaped grooves takes and places the thread inserted into it by the drawing-in hook on one side alongside and on top of the reed.

What we claim as our invention, and desire to secure by Letters Patent, is—

1. In an apparatus for slaying warps, having a drawing-in hook and tongue swinging round a freely-suspended center, means to swing this center during operation parallel to the direction of the reed-dents, means for accurately adjusting the said tongue and hook in relation to each other in accordance with the thickness of the reed-dent and means for adjusting the said hook to suit various reed widths, all substantially as and for the purpose set forth.

2. In an apparatus for slaying warps, a suspended parallelogrammic frame with sides pivotally connected together, a tool-holder eccentrically mounted upon a shaft forming the lower side of the said parallelogrammic frame, means for turning the said tool-holder, a drawing-in hook and tongue carried by the said tool-holder, an oscillating scroll, a connection between the said scroll and the said tool-holder for turning the latter, an angular lever-arm adjustable in the said parallelogrammic frame and a crank-stud in the said scroll for oscillating the said parallelogrammic frame, all substantially as and for the purpose set forth.

3. In an apparatus for slaying warps, a suspended parallelogrammic frame with sides pivotally connected together, a tool-holder eccentrically mounted upon a shaft forming the lower side of the said parallelogrammic frame, means for turning the said tool-holder, a drawing-in hook and tongue bearing against each other carried by the said tool-holder, a stud in the latter upon which the said tongue is adapted to turn, a set-screw above the said tool-holder and an arm on the said tongue engaging in the said set-screw, all substantially as and for the purpose set forth.

In witness whereof we have hereunto set our hands in presence of two witnesses.

JOSEPH JOUBERT.
FRÉDÉRIC SUTER.

Witnesses:
MARIN VACHON,
ARMÉ FLÉCHET.